United States Patent [19]

Elfenthal et al.

[11] Patent Number: 5,215,580
[45] Date of Patent: Jun. 1, 1993

[54] PROCESS FOR THE PRODUCTION OF A FINE PARTICLE TITANIUM DIOXIDE

[75] Inventors: Lothar Elfenthal, Langenfeld; Edgar Klein, Odenthal; Franz Rosendahl, Leverkusen, all of Fed. Rep. of Germany

[73] Assignee: Kronos USA, Inc., Hightstown, N.J.

[21] Appl. No.: 835,749

[22] Filed: Feb. 6, 1992

[30] Foreign Application Priority Data

Feb. 21, 1991 [DE] Fed. Rep. of Germany ....... 4105345

[51] Int. Cl.$^5$ ................................................ C09D 5/36
[52] U.S. Cl. ..................................... 106/441; 106/436
[58] Field of Search ................................ 106/441, 436

[56] References Cited

U.S. PATENT DOCUMENTS

| | | | |
|---|---|---|---|
| 4,753,829 | 6/1988 | Panush | 427/385.5 |
| 5,137,575 | 8/1992 | Yasuki et al. | 106/441 |

FOREIGN PATENT DOCUMENTS 0270472  6/1988  European Pat. Off. .

Primary Examiner—Mark L. Bell
Assistant Examiner—Chris Gallo
Attorney, Agent, or Firm—Michael J. Cronin

[57] ABSTRACT

A process produces fine particle titanium dioxide essentially transparent to visible light and essentially UV radiation absorbing. During preparation of the titanium dioxide product, tin dioxide with a particle size of 1 to 10 nm, and preferably 1 to 4 nm, is added, in an amount of 0.5 to 10 weight percent with respect to $TiO_2$. The particle size of the titanium dioxide is specifically adjusted by the tin dioxide addition. Acicular particles are rounded by heat-treatment between 300° and 800° C., and preferably between 400° and 600° C. The particles can be post-treated to produce a coating of inorganic and/or organic substances. The fine particle titanium dioxide can be prepared by the decomposition of sodium titanate with hydrochloric acid or by suitable hydrolysis of a tetravalent titanium compound which leads to rutile formation. A currently preferred way of adding the tin dioxide is as a colloidal sol which is prepared by the reaction of tin tetrachloride with water at a maximum of 22° C.

28 Claims, No Drawings

PROCESS FOR THE PRODUCTION OF A FINE PARTICLE TITANIUM DIOXIDE

BACKGROUND AND SUMMARY OF THE INVENTION

The present invention relates to a process for the production of a fine particle titanium dioxide which is essentially transparent to visible light and essentially UV radiation absorbing, and also to a fine particle titanium dioxide product itself which is essentially transparent to visible light and essentially UV radiation absorbing.

It is generally known that the scattering power of a pigment e.g. a white pigment in visible light is dependent upon the particle size. For titanium dioxide pigments, the optimum particle size for scattering power, depending on the surrounding medium, is about half the wavelength of the light. Below this optimum particle size the scattering power decreases with decreasing particle size. As a result of the reduction of scattering power reduction for visible light, media which are naturally transparent retain their transparency to a large extent when a fine particle titanium dioxide, with a particle size considerably less than half the wavelength of the light, is incorporated in them. In other words, such a titanium dioxide is essentially transparent to visible light. The absorption of UV radiation is practically unaffected by the decreasing particle size of crystalline titanium dioxide.

Fine particle titanium dioxide which is essentially transparent to visible light and essentially UV radiation absorbing, is also referred to as "subpigmentary titanium dioxide" in the following description.

There are many uses for subpigmentary titanium dioxide. It is used in plastic foil or plastic containers which allow the inside to be seen through the walls. The contents, however, are protected by the subpigmentary titanium dioxide in the walls which absorbs the damaging UV portion of the sunlight. Subpigmentary titanium dioxide is used as a UV radiation absorber in paint e.g. protective glazing for wood. Other uses are in automotive paints and cosmetics, e.g. cosmetics for protection against the sun and other skin care preparations to which subpigmentary titanium dioxide is added to absorb damaging UV radiation. A special us is in producing special optical effects in paints e.g. the so-called "downflop" as referred to in EP-A1-0 270 472 and corresponding to U.S. Pat. No. 4,753,829.

There are various methods for producing subpigmentary titanium dioxide. One suitable procedure for producing acicular products is described, for example, in DE-A1-38 17 909. The hydrolysis of a suitable titanium compound such as titanium tetrachloride or an organic or inorganic titanate, or the oxidation of an oxidizable titanium compound, e.g. in the gaseous state, may be used for this purpose. A special process for the production of an acicular subpigmentary titanium dioxide is also described there in which a titanium dioxide hydrate which has been obtained in the usual way by hydrolysis of a titanyl sulphate solution is reslurried in water, heated and then added to a hot sodium hydroxide solution. The resulting mixture is kept at the boiling point for a period of time. The suspension now containinq sodium titanate is cooled, filtered and the filter cake washed. Thereafter, the pH of the sodium titanate containing mixture is reduced to between 2.8 and 3.1 by the addition of hydrochloric acid and then further hydrochloric acid is added to peptize the mixture. This treatment causes the sodium titanate to be hydrolytically decomposed. The mixture then contains titanium dioxide which is present as very fine acicular particles whose small crystallites have a rutile structure. The solids in the mixture are flocculated by neutralization and subsequently separated from the liquid by filtration and washed. It is also known from CA-A 962 142 to add $K_2O$ and $P_2O_5$ to a subpigmentary titanium dioxide of this type and to calcine it at between 500° and 800° C.

The use of such known methods makes it difficult, however, to vary the particle size and particle shape of the subpigmentary titanium dioxide to correspond to the requirements of the different fields of application. In this connection, the above-referenced U.S. Pat. No. 4,753,829 discloses an opalescent coating composition especially designed as an automotive paint finish on a metal substrate. The coating composition comprises a thermoplastic or thermosetting resin, a transparent metal oxide pigment having a particle size of preferably about 20 nm to 30 nm, and metallic or metallic-like pigment. Because of the particular application of this composition in which high chromaticity and excellent downflop characteristics are disclosed as being of utmost importance, the metal oxide used therein is of a fundamentally different kind of the type which forms the subject of the present application in that the former is useful primarily in metallic automobile paint finishes whereas the latter is useful also for plastic foils and plastic containers, all types of paints, protective glazings for wood, cosmetics, skin care products and the like.

In more structural terms, it can be said that the coating composition in said U.S. Pat. No. 4,753,829 is thus limited to metal oxide pigments with particle sizes somewhere between 10 to 45 nm and preferably to an even narrower range of about 20 to 30 nm. Although titanium dioxide pigment is disclosed as preferred among the known metal oxide pigments whose transparency and UV absorptivity parameters are acceptable, it is preferred primarily because of opalescence, chromaticity and downflop characteristics. The disclosed method of preparation of the pigment is one which does not control both size and shape of the titanium dioxide pigment. Moreover, despite the possibility of pigment modification using, for example, aluminum laurate or aluminum stearate, the particular titanium dioxide pigment does not include and are not intended to include other metal oxides. This is to be contrasted with the composition of the present invention which is a subpigmentary transparent titanium dioxide with a particle size range of 10 to 100 nm and containing fine particle tin dioxide, and the method of preparation of such a product to control both size and shape of the titanium dioxide to assure it will be transparent to visible light and, at the same time, essentially UV radiation absorbing in a wide variety of applications.

A new process has been discovered for the production of a fine particle titanium dioxide that is essentially transparent to visible light and essentially UV radiation absorbing which avoids the disadvantages of the known production methods. This new process is characterized by the production of fine particle titanium dioxide with fine particle tin dioxide with a particle size between 1 and 10 nm, and preferably between 1 and 4 nm, added in an amount from 0.5 to 10 weight percent with respect to the amount of titanium dioxide produced.

In addition to the us of the fine particle tin dioxide in accordance with the invention, this new process can contain all the known process steps for the production of subpigmentary titanium dioxide.

A particular way of carrying out the novel process described herein comprises:

a) slurrying a titanium dioxide hydrate with anatase structure produced by the hydrolysis of a titanyl sulphate solution in water at a concentration of 20 to 26 weight percent $TiO_2$, b) heating the resulting titanium dioxide hydrate suspension to 70° C., c) adding the heated titanium dioxide hydrate suspension to aqueous sodium hydroxide solution at 90° to 100° C. while continually stirring, the amount of sodium hydroxide being such that, after the addition of the titanium dioxide hydrate suspension, the weight ratio of $NaOH:TiO_2$ in the mixture is 1.25 to 1.65, d) heating the mixture to boiling and holding the mixture at the boiling point for 120 to 140 minutes, e) then cooling the mixture to 50° to 60° C. and filtering, f) washing the resulting filter cake until the $SO_4''$ content in the wash filtrate is less than 0.05 g $l^{-1}$, g) repulping the washed filter cake in water to 10 to 25 weight percent $TiO_2$ and adjusting the pH of the resulting mixture to between 2.8 and 3.1 with hydrochloric acid containing 20-25 weight percent HCl, h) heating the mixture to a temperature of 55° to 60° C. and leaving it at this temperature for 30 to 45 minutes while maintaining the pH in the range of 2.8 to 3.1, i) adding a colloidal tin dioxide sol containing tin dioxide with a particle size of 1-10 nm, preferably 1-4 nm, to the mixture, j) adding sufficient 20-25 weight percent HCl containing hydrochloric acid to the colloidal tin dioxide sol additioned mixture at 55° to 65° C. to induce peptization, and adjusting the weight ratio of added hydrochloric acid, calculated as HCl, to $TiO_2$ to 0.15:1 to 0.25:1, k) heating the resulting suspension to boiling over a period of 30 to 40 minutes and holding it at the boiling point for 60 to 90 minutes, and l) neutralizing the suspension to pH 4–11, preferably to pH 6–8.

Another contemplated method of carrying out the present invention includes producing the fine particle titanium dioxide in the presence of tin dioxide with a particle size of 1-10 nm, preferably 1-4 nm, by the hydrolysis of a tetravalent titanium compound under conditions which yield a rutile structure.

Yet another and particularly suitable way contemplated for carrying out the process of the present invention uses titanium tetrachloride as the tetravalent titanium compound, or a compound is used which is formed by the reaction of water with titanium tetrachloride. Hydrolysis can be brought about, e.g. by heating, if need be after diluting the solution with water and/or by adding an alkaline reacting substance, e.g. sodium hydroxide.

It is essential that the tin dioxide added has a particle size predominantly from 1 to 10 nm, and preferably from 1 to 4 nm. Since the particle size of the tin oxide is available as a statistical distribution in the normal way, it is to be understood that the tin dioxide can also contain to a lesser extent particles which lay outside the claimed range. As a rule, the particles with a size between 1 and 4 nm should be strongly represented in the claimed particle size range of 1 to 10 nm since particles of this size are particularly effective in the invented process. The addition of tin dioxide with a particle size above 10 nm is inappropriate because on the addition of the same amount of tin dioxide fewer tin dioxide particles are available.

A particular procedure has been found which makes it possible to prepare and employ tin dioxide with the desired particle size range. Thus, a particularly suitable method of carrying out the procedure according to the present invention includes the use of tin dioxide as a colloidal sol prepared by the slow addition of tin tetrachloride to distilled water at a maximum temperature of 22° C. until a concentration is diluted with distilled water to 10 g $SnO_2 l^{-1}$ while ensuring that the temperature does not exceed 22° C., and aging the diluted solution for 1 hour at 20°-22° C. Other procedures which likewise yield a tin dioxide with a particle size of 1 to 10 nm and preferably 1 to 4 nm can, however, be used without departing from the principles of the present invention.

The fine particle titanium dioxide prepared according to the process of the present invention can be in the form of a suspension, and this suspension can be directly further processed without separating the fine particle titanium dioxide.

In a particular embodiment for carrying out the process of the present invention, the titanium dioxide produced is separated from the liquid phase by flocculation of the suspension followed by filtration and washing. Alternatively, the titanium dioxide which has been separated from the liquid phase of the suspension is dried and then milled.

It is often expedient to add a substance to prevent the formation of hard agglomerates after neutralization. Where the titanium dioxide is dried, the substance is added before drying. Substances suitable for this purpose are, e.g., alkanolamines or polyols. The product according to the present invention thus obtained usually has acicular particles with a rutile structure.

According to a particular method of carrying out the present invention, the dried titanium dioxide is heat-treated at a temperature between 300° and 800° C. and preferably between 400° and 600° C.

If the subpigmentary titanium dioxide prepared in accordance with the invention is acicular, it can be rounded by heat-treatment. In contrast to known procedures, the addition of $K_2O$ and $P_2O_5$ or other substances is unnecessary. If the heat-treatment temperature is held between 400° and 600° C., a marked rounding of the particles occurs without the particle size significantly increasing. At temperatures under 400° C., the rounding effect is less, and at temperatures above 600° C., often an undesired increase in particle size occurs.

The subpigmentary titanium dioxide of the present invention can be used without further post-treatment. It is, however, often expedient in a particular embodiment of the present invention to post-treat the titanium dioxide with one or more inorganic and/or organic substances. These post-treatments coat the subpigmentary titanium dioxide with inorganic and/or organic substances and ca be carried out in the suspension in which the subpigmentary titanium dioxide was prepared. This post-treatment can also be carried out in the context of the final neutralization or on the flocculated titanium dioxide before or after its separation from the suspension and in the last case before or after drying and if need be before or after heat-treatment. A milling can take place before the post-treatment; in this case, it may be necessary to add a dispersing agent before milling the subpigmentary titanium dioxide. Established procedures such as those described in CA-A-962 142 can be used for the post-treatment.

The present invention is also directed to a fine particle titanium dioxide, which is essentially transparent to visible light and essentially UV radiation absorbing, consisting of acicular particles with rutile structure with a length of 10–100 nm and a length:diameter ratio from 8:1 to 3:1. The particles contain 0.5 to 10 weight percent $SnO_2$. Another aspect of the present invention is an aqueous suspension of such a fine particle titanium dioxide.

A yet further aspect of the present invention is a titanium dioxide product which is essentially transparent to visible light and essentially UV radiation absorbing, consisting of rounded particles with a rutile structure with a diameter of 10 to 100 nm. These particles contain 0.5 to 10 weight percent $SnO_2$.

In one particular embodiment of the present invention, this fine particle titanium dioxide consisting of acicular or rounded particles is post-treated to give a coating of at least one inorganic or organic substance. A still further aspect of the present invention is an aqueous suspension of such a coated fine particle titanium dioxide.

It has been found that it is easy to specifically influence the particle size of the produced subpigmentary titanium dioxide in the range of 10 to 100 nm for the longest axis for acicular particles, with a narrow particle size distribution, by controlling the amount of tin dioxide added.

The higher the $SnO_2$ addition, the smaller the particle size of the resulting titanium dioxide. The amount of tin dioxide lays preferably between 1 and 10 weight percent with respect to $TiO_2$. The size of the resulting particles can be determined electron microscopically or by the determination of the BET surface area.

It is essential for the effectiveness of the added colloidal tin dioxide sol that this colloidal tin dioxide sol is so produced that not only the critical particle size range is achieved but also that it is ensured that no increase of the tin dioxide particle size takes place between its preparation and its use in the preparation of subpigmentary titanium dioxide. For this purpose, it is preferred that tin tetrachloride is dripped into distilled water which is being cooled so that the maximum temperature does not exceed 22° C., until a concentration between 180 and 220 g $SnO_2 l^{-1}$ is reached. The resulting stock solution is storage stable for a long period of time.

In order to prepare the desired colloidal tin dioxide sol this stock solution is diluted to 10 g $SnO_2 l^{-1}$ with distilled water. During dilution the temperature must not exceed 22° C. Subsequently the mixture is aged at a temperature of 20° to 22° C. for an hour. The sol is then practically clear and must be used immediately.

DETAILED DESCRIPTION OF THE INVENTION

The present invention is explained in more detail in the following examples.

EXAMPLE 1

An aqueous suspension of washed titanium dioxide hydrate in the anatase form containing 220 g $TiO_2$ which had been obtained by the usual hydrolysis of a titanyl sulphate solution resulting from the digestion of ilmenite in sulfuric acid, the separation of iron(II) sulphate heptahydrate, clarification and concentration, was diluted with distilled water to a suspension containing 26 weight percent $TiO_2$ and heated to about 60° C.

The hot suspension was added while stirring over 30 minutes to 550 g of a 50 weight percent aqueous NaOH solution at 90° C. The resulting mixture was then maintained at the boiling point (about 108° C.) for 2 hours then cooled to about 60° C. and filtered. The filter cake was washed with distilled water until the $SO_4''$ content in the wash filtrate was less than 0.05 g $l^{-1}$ ($SO_4''$ detection with the $BaCl_2$).

The washed filter cake was reslurried with distilled water to a suspension containing 220 g $TiO_2 l^{-1}$. Twenty-five percent (25%) hydrochloric acid was then added until the pH of the mixture was adjusted to 2.8–3.1. The suspension was then heated to 60° C. and left at this temperature for 30 minutes. During this time the pH must not leave the specified range; to this end, the pH was controlled and, if necessary readjusted. Thereafter a colloidal tin dioxide sol was added.

The colloidal tin dioxide sol was prepared as follows:

A stock solution was prepared by dripping tin tetrachloride (p.a. 99% $SnCl_4$) into distilled water, which was being cooled, until a concentration of 200 g $SnO_2 l^{-1}$ was reached. The amount of stock solution, corresponding to the amount of $SnO_2$ required for the preparation of the subpigmentary titanium dioxide, was diluted with distilled water to 10 g $SnO_2 l^{-1}$. During dilution the temperature was not allowed to exceed 20° C. Subsequently the mixture was aged for one hour at 20° C. The sol was now practically clear and had to be used at once.

After adding the colloidal tin dioxide sol, the suspension was additioned with a sufficient amount of 25 weight percent hydrochloric acid to achieve a weight ratio of the added hydrochloric acid, calculated as HCl, to $TiO_2$ of 0.15:1 to peptize the suspension. The mixture was heated to boiling over 30 minutes (boiling temperatures of about 108° C.) and held at the boiling temperature for 90 minutes. The mixture now had a concentration of about 100– 160 g $TiO_2 l^{-1}$ depending on the volume of colloidal tin dioxide sol added.

The titanium dioxide in the suspension was flocced by neutralizing with sodium hydroxide solution to a pH of 6 to 7 then separated by filtration and washed. The resulting subpigmentary titanium dioxide consisted of acicular particles with the crystalline particles having a rutile structure.

The amount of colloidal tin dioxide sol added, calculated as $SnO_2$ with respect to $TiO_2$, was varied between 1 and 10 weight percent. The resulting products were examined using an electron microscope and their BET surface area determined in accordance with DIN 66132. The results are listed in Table 1. As a comparison, a product is also listed in Table 1 which was prepared in the same way as the product prepared according to the present invention but without the addition of the colloidal tin dioxide sol.

TABLE 1

| $SnO_2$ addition weight percent with reference to $TiO_2$ | BET $m^2 g^{-1}$ | particle size measured on the longest axis nm |
| --- | --- | --- |
| 0 | 98–116 | 110 ± 10 |
| 1 | 110 | 80 ± 10 |
| 2 | 135 | 42 ± 7 |
| 4 | 145 | 35 ± 10 |
| 5.5 | 155 | 25 ± 10 |

TABLE 1-continued

| SnO2 addition weight percent with reference to TiO2 | BET $m^2 g^{-1}$ | particle size measured on the longest axis nm |
| --- | --- | --- |
| 7.5 | 155 | 20 ± 10 |
| 10 | 165 | 15 ± 5 |

Table 1 clearly shows the effectiveness of the SnO2 addition on the particle size of the resulting subpigmentary titanium dioxide. Likewise; it can be seen that it is easy to achieve the desired particle size by choosing the appropriate SnO2 addition.

EXAMPLE 2

A subpigmentary titanium dioxide was prepared as in Example 1 with various amounts of colloidal tin dioxide sol being added. In each case, the resulting products were heat-treated for 2 hours at various temperatures. The longest axis and the axis ratio (longest:shortest axis) were determined electron-microscopically for the particles of the heat-treated products and their BET surface areas determined in accordance with DIN 66132. The results are shown in Table 2. As a comparison, a non-heat-treated product and a product prepared without a SnO2 addition are also included.

TABLE 2

| SnO2 addition weight percent with reference to TiO2 | | Heat-treatment Temperature | | | |
| --- | --- | --- | --- | --- | --- |
| | | No heat-treatment | 400 | 600 | 800 |
| 0 | a) | 110 ± 10 | 110 ± 20 | 110 ± 20 | 110 ± 20 |
| | b) | 5 | 5 | 3 | 2 |
| | c) | 98–116 | 50 | 34 | 23 |
| 1 | a) | 80 ± 10 | 60 ± 10 | 50 ± 10 | 70 ± 20 |
| | b) | 5 | 4 | 2 | 1–1.5 |
| | c) | 110 | 66 | 40 | 23 |
| 7.5 | a) | 20 ± 10 | 20 ± 10 | 20 ± 10 | 50 ± 20 |
| | b) | 5 | 2 | 1–1.5 | 1–1.5 |
| | c) | 155 | 93 | 53 | 20 | a) Particle size (longest axis) in nm
b) Axis ratio of the particles
c) BET surface area in $m^2 g^{-1}$ Table 2 shows that heat-treating the subpigmentary titanium dioxide causes a significant rounding of the particles. For the products prepared using SnO2 and heat-treated at temperatures between 400° and 600° C., this rounding was accompanied by a certain reduction in surface area due essentially to the rounding. At a temperature of 800° C., there was a significant additional reduction in surface area caused by an increase in particle size. Table 2 also shows that the heat-treated products with SnO2 have a significantly higher surface area than the heat-treated product without SnO2 addition due to the significantly smaller particle size of the former.

EXAMPLE 3

260 ml of a colloidal tin dioxide sol containing 10 g $SnO_2 l^{-1}$, prepared as in Example 1, was added in 2 minutes while stirring to 671.2 ml distilled water at a temperature of 20° to 22° C. Immediately after the addition of the colloidal tin dioxide sol, 118.7 g titanium tetrachloride were dripped to this mixture over 140 minutes with the mixture being cooled to maintain a temperature of 20° to 22° C. After the addition of the titanium tetrachloride, the mixture was stirred for a further 5 minutes at this temperature.

The resulting slightly cloudy solution is continually stirred and heated at a rate of 2° to 3° C. minute$^{-1}$ to the boiling temperature (about 107° C.) and left at this temperature for 120 minutes. During the heating the solution became at first clear but then at about 90° C. became cloudy again because titanium dioxide was precipitated. The suspension was cooled to 40° C. and the titanium dioxide separated by filtration. 5.2 weight percent SnO2, with respect to the TiO2 produced, was added.

The resulting subpigmentary titanium dioxide consisted of acicular particles with a rutile structure and a size of 40±10 nm, measured on the longest axis. The axis ratio (longest axis:shortest axis) was about 4.

In summary, the present invention concerns a process for the preparation of fine particle titanium dioxide and fine particle titanium dioxide. The titanium dioxide is essentially transparent to visible light and essentially absorbing for UV radiation. During its preparation, the novel product is additioned with fine particle tin dioxide having a particle size of 1 to 10 nm, and preferably 1–4 nm, in an amount of 0.5 to 10 weight percent with respect to TiO2. The particle size of the titanium dioxide is specifically adjusted by heat-treatment at 300° to 800° C., preferably at 400° to 600° C. Post-treatment can yield particles coated with inorganic and/or organic substances. The fine particle titanium dioxide can be produced by decomposing sodium titanate with hydrochloric acid or by a suitable hydrolysis of a compound of tetravalent titanium which leads to a rutile structure. It is preferred to add the tin dioxide as a colloidal sol formed by the decomposition of tin tetrachloride with water at a maximum of 22° C.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for producing fine particle titanium dioxide essentially transparent to visible light and essentially UV radiation absorbing, comprising the steps of preparing fine particle titanium dioxide, and adding fine particle tin dioxide having a particle size of 1 to 10 nm during preparation of the fine particle titanium dioxide, the tin dioxide being added in an amount of 0.5 to 10 weight percent with respect to the amount of titanium dioxide prepared.

2. The process according to claim 1, wherein the fine particle tin dioxide has a particle size of 1 to 4 nm.

3. The process according to claim 1, wherein the step of preparing the fine particle titanium dioxide comprises:

a) slurrying a titanium dioxide hydrate with anatase structure prepared by the hydrolysis of a titanium sulphate solution in water to a concentration of 20 to 26 weight percent TiO2, b) heating the resulting titanium dioxide hydrate suspension to 60° to 70° C., c) adding the hot titanium dioxide hydrate suspension to aqueous sodium hydroxide solution at 90° to 100° C. while continually stirring, the amount of sodium hydroxide being such that after the addition of the titanium dioxide hydrate suspension the weight ratio of NaOH:TiO2 in the mixture is 1.25 to 1.65, d) heating the mixture to boiling and holding it at the boiling point for 120 to 140 minutes, e) cooling the mixture to 50° to 60° C. and then filtering the mixture, f) washing the resulting filter cake until the $SO_4''$ content of the wash filtrate is less than 0.05 g $l^{-1}$, g) slurrying the washed filter cake in water to a $TiO_2$ concentration of 10 to 25 weight percent and adding hydrochloric acid containing 20 to 25 weight percent HCl to the resulting mixture until pH 2.8 to 3.1 is reached, h) heating the mixture to a temperature of 55° to 65° C. and holding the mixture at this temperature for 30 to 45 minutes while maintaining the pH in the range of 2.8 to 3.1, i) adding colloidal tin dioxide sol with a particle size of 1 to 10 nm to the mixture, j) peptizing the mixture containing the colloidal tin dioxide sol by the addition of hydrochloric acid containing 20 to 25 weight percent HCl while adding sufficient hydrochloric acid to give a weight ratio of $HCl:TiO_2$ from 0.15:1 to 0.25:1, k) heating the resulting suspension to boiling over a period of 30 to 45 minutes and holding it at the boiling point for 60 to 90 minutes, and l) neutralizing the suspension to a pH range of 4 to 11.

4. The process according to claim 3, wherein the fine particle tin dioxide has a particle size of 1 to 4 nm.

5. The process according to claim 4, where the suspension has a pH range of 6 to 8.

6. The process according to claim 1, wherein the step of preparing fine particle titanium dioxide comprises the hydrolysis of a tetravalent titanium compound under conditions which yield a rutile structure in the presence of tin dioxide with a particle size of 1–10 nm.

7. The process according to claim 6, wherein the fine particle tin dioxide has a particle size of 1 to 4 nm.

8. The process according to claim 6, wherein one of a titanium tetrachloride and a compound formed by the reaction of water with titanium tetrachloride is used as the tetravalent titanium compound.

9. The process according to claim 8, wherein the fine particle tin dioxide has a particle size of 1 to 4 nm.

10. The process according to claim 9, where the suspension has a pH range of 6 to 8.

11. The process according to claim 1, wherein the tin dioxide is used as a colloidal sol prepared by slow addition of tin tetrachloride to distilled water at a maximum temperature of 22° C. until a concentration of 180–220 g $SnO_2 l^{-1}$ is reached, diluting the solution to 10 g $SnO_2 l^{-1}$ with distilled water while ensuring that the temperature does not exceed 22° C., and aging the diluted solution for 1 hour at 20° to 22° C.

12. The process according to claim 11, wherein the step of preparing the fine particle titanium dioxide comprises:

a) slurrying a titanium dioxide hydrate with anatase structure prepared by the hydrolysis of a titanium sulphate solution in water to a concentration of 20 to 26 weight percent $TiO_2$, b) heating the resulting titanium dioxide hydrate suspension to 60° to 70° C., c) adding the hot titanium dioxide hydrate suspension to aqueous sodium hydroxide solution at 90° to 100° C. while continually stirring, the amount of sodium hydroxide being such that after the addition of the titanium dioxide hydrate suspension the weight ratio of $NaOH:TiO_2$ in the mixture is 1.25 to 1.65, d) heating the mixture to boiling and holding it at the boiling point for 120 to 140 minutes, e) cooling the mixture to 50° to 60° C. and then filtering the mixture, f) washing the resulting filter cake until the $SO_4''$ content of the wash filtrate is less than 0.05 g $l^{-1}$, g) slurrying the washed filter cake in water to a $TiO_2$ concentration of 10 to 25 weight percent and adding hydrochloric acid containing 20 to 25 weight percent HCl to the resulting mixture until pH 2.8 to 3.1 is reached, h) heating the mixture to a temperature of 55° to 65° C. and holding the mixture at this temperature for 30 to 45 minutes while maintaining the pH in the range of 2.8 to 3.1, i) adding colloidal tin dioxide sol with a particle size of 1 to 10 nm to the mixture, j) peptizing the mixture containing the colloidal tin dioxide sol by the addition of hydrochloric acid containing 20 to 25 weight percent HCl while adding sufficient hydrochloric acid to give a weight ratio of $HCl:TiO_2$ from 0.15:1 to 0.25:1, k) heating the resulting suspension to boiling over a period of 30 to 45 minutes, and holding it at the boiling point for 60 to 90 minutes and l) neutralizing the suspension to a pH range of 4 to 11.

13. The process according to claim 11, wherein the step of preparing fine particle titanium dioxide comprises the hydrolysis of a tetravalent titanium compound under conditions which yield a rutile structure in the presence of tin dioxide with a particle size of 1–10 nm.

14. The process according to claim 3, further comprising the step of separating the titanium dioxide produced from the liquid phase of the suspension by flocculation and filtration.

15. The process according to claim 14, further comprising the step of washing the separated titanium dioxide.

16. The process according to claim 14, further comprising the step of drying the separated titanium dioxide.

17. The process according to claim 16, further comprising the step of milling the dried titanium dioxide.

18. The process according to claim 17, further comprising the step, after neutralization of adding a conventional substance to prevent formation of hard agglomerates and before drying the titanium dioxide.

19. The process according to claim 17, further comprising the step of heat-treating the dried titanium dioxide at 300° to 800° C.

20. The process according to claim 19, wherein the step of heat-treating takes place at 400° to 600° C.

21. The process according to claim 1, further comprising the step of post-treating the titanium dioxide with at least one of inorganic and organic substances.

22. A fine particle titanium dioxide essentially transparent to visible light and essentially UV radiation absorbing, consisting of 10 to 100 nm long acicular particles with a rutile structure and a length:diameter ratio from 8:1 to 3.:1, wherein these particles contain 1 to 10 weight percent $SnO_2$.

23. An aqueous suspension of fine particle titanium dioxide essentially transparent to visible light and essentially UV radiation absorbing, consisting of 10 to 100 nm long acicular particles with a rutile structure and a length:diameter ratio from 8:1 to 3.:1, wherein these particles contain 1 to 10 weight percent $SnO_2$.

24. A fine particle titanium dioxide essentially transparent to visible light and essentially UV radiation absorbing, consisting of rounded particles with a rutile structure and a diameter of 10 to 100 nm which contain 0.5 to 10 weight percent $SnO_2$.

25. The fine particle titanium dioxide according to claim 13, wherein a coating of at least one of inorganic and organic substances is applied by post-treatment.

26. The fine particle titanium dioxide according to claim 24, wherein a coating of at least one of inorganic and organic substances is applied by post-treatment.

27. An aqueous suspension of fine particle titanium dioxide essentially transparent to visible light and essentially UV radiation absorbing, consisting of rounded particles with a rutile structure and a diameter of 10 to 100 nm which contain 0.5 to 10 weight percent $SnO_2$ and a coating of at least one of inorganic and organic substances applied by post-treatment.

28. A fine particle titanium dioxide essentially transparent to visible light and essentially UV radiation absorbing, produced by the process of claim 1.

* * * * *